US011405979B2

United States Patent
Sakai (10) Patent No.: US 11,405,979 B2
(45) Date of Patent: Aug. 2, 2022

(54) COMMUNICATION APPARATUS, METHOD FOR CONTROLLING COMMUNICATION APPARATUS, AND NON-TRANSITORY COMPUTER-READABLE STORAGE MEDIUM

(71) Applicant: CANON KABUSHIKI KAISHA, Tokyo (JP)

(72) Inventor: Tatsuhiko Sakai, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/198,391

(22) Filed: Mar. 11, 2021

(65) Prior Publication Data

US 2021/0204356 A1    Jul. 1, 2021

Related U.S. Application Data

(63) Continuation of application No. PCT/JP2019/040798, filed on Oct. 17, 2019.

(30) Foreign Application Priority Data

Oct. 24, 2018 (JP) .............................. JP2018-200300

(51) Int. Cl.
*H04W 72/08* (2009.01)
*H04W 72/04* (2009.01)
(Continued)

(52) U.S. Cl.
CPC ......... *H04W 76/34* (2018.02); *H04W 68/005* (2013.01); *H04W 88/085* (2013.01)

(58) Field of Classification Search
None
See application file for complete search history.

(56) References Cited

U.S. PATENT DOCUMENTS 9,307,387 B2    4/2016  Sakai et al.
10,200,903 B2   2/2019  Goto et al.
(Continued)

FOREIGN PATENT DOCUMENTS

CN    104982058 A      10/2015
CN    107634783 A  *   1/2018
(Continued)

OTHER PUBLICATIONS

International Search Report issued in International Application No. PCT/JP2019/040798 dated Jan. 7, 2019, pp. 1, English Translation.
(Continued)

*Primary Examiner* — Gary Lafontant
(74) *Attorney, Agent, or Firm* — Carter, DeLuca & Farrell LLP (57) ABSTRACT

A communication apparatus, when it perform data communication using a master base station and a secondary base station, stops communication with the secondary base station, confirms with a user whether or not the data communication is to continue in a case where communication with the secondary base station is stopped, and in a case where it was confirmed that the data communication is not continue, stops communication with the master base station.

11 Claims, 7 Drawing Sheets

(51) Int. Cl.
*H04W 76/34* (2018.01)
*H04W 68/00* (2009.01)
*H04W 88/08* (2009.01)

(56) References Cited

U.S. PATENT DOCUMENTS

| | | | |
|---|---|---|---|
| 10,462,696 B2 | 10/2019 | Goto et al. | |
| 2015/0341945 A1* | 11/2015 | Panchai | H04W 72/085 370/329 |
| 2017/0026920 A1 | 1/2017 | Dinan | |
| 2020/0037193 A1 | 1/2020 | Goto et al. | |

FOREIGN PATENT DOCUMENTS

| | | | |
|---|---|---|---|
| CN | 108605328 A | | 9/2018 |
| EP | 3836609 A1 | | 6/2021 |
| JP | 2007-184771 A | | 7/2007 |
| JP | 2016123053 A | * | 1/2016 |
| JP | 2016-127383 A | | 7/2016 |
| JP | 2016123053 A | * | 7/2016 |
| JP | 2017-046077 A | | 3/2017 |

OTHER PUBLICATIONS

Extended European Search Report issued by the European Patent Office dated May 31, 2022 in corresponding EP Patent Application No. 19876346.8.

\* cited by examiner

COMMUNICATION APPARATUS, METHOD FOR CONTROLLING COMMUNICATION APPARATUS, AND NON-TRANSITORY COMPUTER-READABLE STORAGE MEDIUM

CROSS-REFERENCE TO RELATED APPLICATIONS

This application is a Continuation of International Patent Application No. PCT/JP2019/040798, filed Oct. 17, 2019, which claims the benefit of Japanese Patent Application No. 2018-200300, filed Oct. 24, 2018, both of which are hereby incorporated by reference herein in their entirety.

BACKGROUND OF THE INVENTION

Field of the Invention

The present invention relates to a communication apparatus, a method for controlling the communication apparatus, and a non-transitory computer-readable storage medium.

Background Art

The 3GPP (3rd Generation Partnership Project) Release 12 (Rel-12) specification defines Dual Connectivity (DC) for simultaneous communication with multiple base stations. With dual connectivity, a User Equipment (UE) performs simultaneous transmission using Component Carriers (CC) provided by multiple base stations (PTL 1). Specifically, the UE divides an EPS (Evolved Packet System) bearer or packet sequence and simultaneously transmits the divided packet sequences to CCs provided by multiple base stations. More specifically, the UE transmits the divided packet sequences to a master base station serving as a master node (MN) and a secondary base station serving as a secondary node (SN). After receiving packets, the master base station or the secondary base station reorders the received packet sequence and the packet sequence received from the other base station to reconstruct the packet sequence from the UE. After reconstructing the packet sequence, the master base station or the secondary base station transfers the reconstructed packet sequence to a core node (CN).

In 5G as well, which is a next-generation communication standard currently being formulated by 3GPP, it is defined that DC can be used in a non-standalone mode in which there is cooperation between 5G and LTE (Long Term Evolution), which are different wireless systems. This allows a UE to carry out LTE communication and 5G communication at the same time, thus improving user throughput.

CITATION LIST

Patent Literature

PTL 1: Japanese Patent Laid-Open No. 2016-127383

As mentioned above, when a UE performs LTE communication and 5G communication at the same time, an improvement in performance can be expected with DC, but an increase in power consumption is expected due to using communication circuits for multiple systems at the same time for data communication. For example, if a digital camera serving as the UE performs LTE communication and 5G communication at the same time in order to upload captured images to a server, the battery may run out earlier than in the case where only LTE communication is used. In other words, if the digital camera is in a state where DC is always activated, the battery may run out prematurely. As a result, the image capturing function, which is the main function of the digital camera, cannot be used, thus reducing user convenience.

In such a case, in order to reduce power consumption while maintaining communication, it is conceivable for the digital camera to stop DC and continue with only LTE communication. However, since the throughput in LTE communication is about one tenth of the throughput in 5G communication, it is expected that data communication will take a long time to complete if only LTE communication is used. In such a situation, the user of the digital camera cannot end the data communication as they desire, thus reducing user convenience. Note that a similar problem may occur when downloading captured images.

SUMMARY OF THE INVENTION

In view of the above problems, the present disclosure provides a technique according to which the communication mode to be used after dual connectivity (DC) is stopped can be determined by user selection.

According to one aspect of the present invention, there is provided a communication apparatus, which comprises a communication unit configured to perform data communication using a master base station and a secondary base station; a first stopping unit configured to stop communication with the secondary base station when the communication unit is performing the data communication using the master base station and the secondary base station; a confirming unit configured to confirm with a user whether or not the data communication is to continue in a case where communication with the secondary base station is stopped by the first stopping unit; and a second stopping unit configured to stop communication with the master base station if the confirming unit confirmed that the data communication is not to continue.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

DESCRIPTION OF THE EMBODIMENTS

Hereinafter, the present invention will be described in detail by way of examples of embodiments with reference to the accompanying drawings. Note that the configurations shown in the following embodiments are merely examples, and the present invention is not limited to the illustrated configurations.

First Embodiment

Network Configuration

Figure 3:
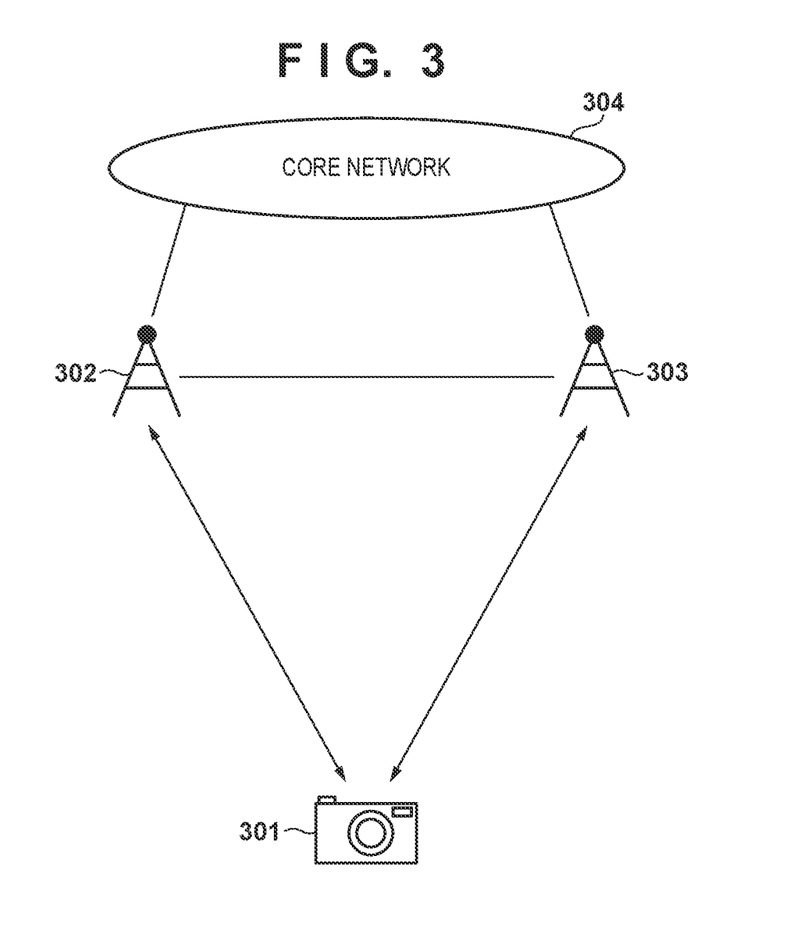
FIG. 3 is a diagram showing an example of a network configuration according to an embodiment.

An example of the network configuration of the present embodiment is shown in FIG. 3. The network configuration shown in FIG. 3 includes a digital camera 301, an LTE base station 302, and a 5G base station 303. The LTE base station 302 can perform communication according to the LTE communication system, which conforms to the 3GPP standard, and the 5G base station 303 can perform communication according to the 5G communication system, which conforms to the 3GPP standard. The digital camera 301, which is a UE, is located in the cell (communicable range) of both the LTE base station 302 and 5G base station 303, and supports dual connectivity (DC) capability for communicating with both of the base stations at the same time. In the present embodiment, the digital camera 301 uses DC to transmit captured image data to the LTE base station 302 and the 5G base station 303 in order for the captured image data to be uploaded to a network device (not shown) such as a server that is connected to a core network 304. The LTE base station 302 and the 5G base station 303 transmit the captured image data received from the digital camera 301 to the network device (not shown) connected to the core network 304.

In the present embodiment, the LTE base station 302 functions as a master base station (MN), and the 5G base station 303 functions as a secondary base station (SN). In DC communication, the LTE base station 302, which is the master base station, controls simultaneous communication between the digital camera 301 and the LTE base station 302 and between the digital camera 301 and the 5G base station 303, and also controls communication with the higher core network 304.

Digital Camera Configuration

Figure 1:
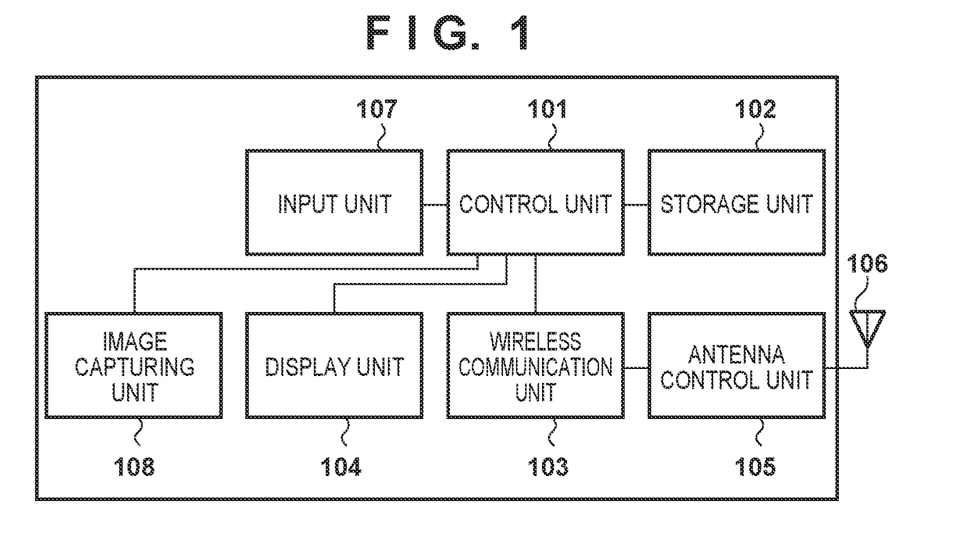
FIG. 1 is a diagram showing an example of the hardware configuration of a digital camera according to an embodiment.

FIG. 1 shows an example of the hardware configuration of the digital camera 301 according to the present embodiment. As an example of the hardware configuration, the digital camera includes a control unit 101, a storage unit 102, a wireless communication unit 103, a display unit 104, an antenna control unit 105, an antenna 106, an input unit 107, and an image capturing unit 108. The control unit 101 performs overall control of the digital camera 301 by executing a control program stored in the storage unit 102. The storage unit 102 stores the control program executed by the control unit 101 and various types of information such as captured image data, communication parameters, and authentication information. The communication parameters and authentication information can be used when connecting with the LTE base station 302 and the 5G base station 303. Various types of operations of the digital camera 301, which will be described later, can be performed by the control unit 101 executing the control program stored in the storage unit 102. The wireless communication unit 103 performs cellular network communication by LTE, 5G, or the like, and wireless communication by Wi-Fi or the like. The display unit 104 has a function for outputting visually recognizable information, as with an LCD or LED, and a function for sound output, as with a speaker or the like, and performs various types of display. The antenna control unit 105 controls the antenna 106 in order to perform wireless communication. The input unit 107 has an operation function for operating the digital camera 301, and accepts various types of inputs/operations performed by the user. Note that the input unit 107 and the display unit 104 may be configured as a user interface (UI) by functioning together in combination. The image capturing unit 108 has an image capturing function, performs image capturing processing, and generates captured image data.

Figure 2:
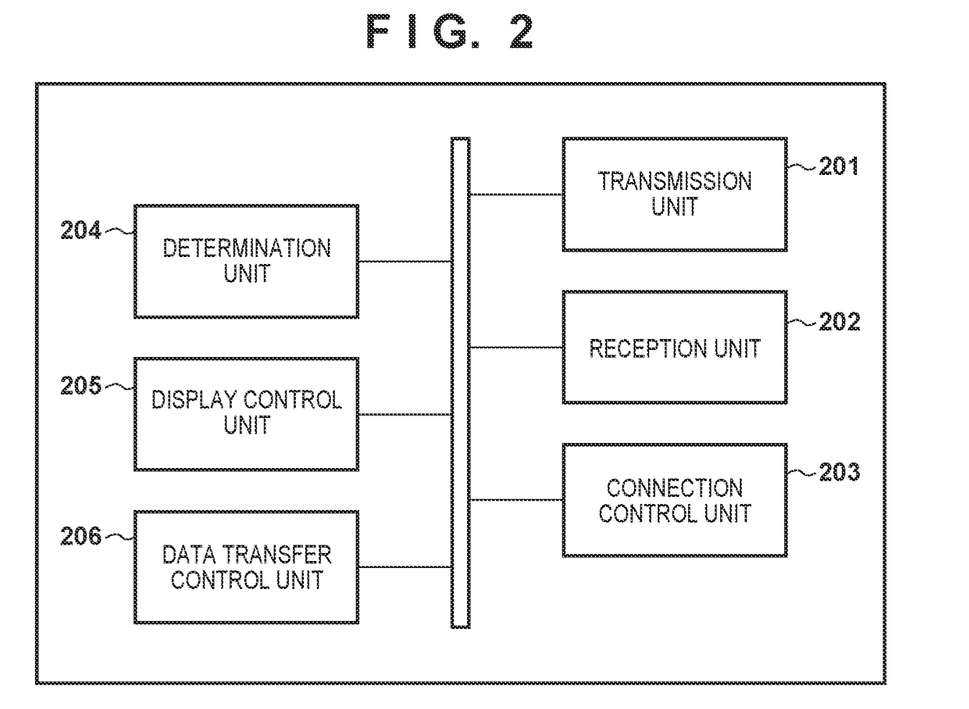
FIG. 2 is a diagram showing an example of the software functional configuration of the digital camera according to an embodiment.

FIG. 2 shows an example of the software functional configuration of the digital camera 301 according to the present embodiment. As an example of the software functional configuration, the digital camera has a transmission unit 201, a reception unit 202, a connection control unit 203, a determination unit 204, a display control unit 205, and a data transfer control unit 206.

The transmission unit 201 and the reception unit 202 each transmit signals (e.g., various types of messages/information and captured image data) to partner apparatus(es) and receive signals (e.g., various types of messages/information) via the wireless communication unit 103. The connection control unit 203 controls and manages connections with the LTE base station 302 and the 5G base station 303 through the transmission and reception of predetermined signals by the transmission unit 201 and the reception unit 202. During communication with the LTE base station 302, the determination unit 204 executes communication continuation determination processing, which is processing for determining whether or not communication needs to continue, based on a predetermined condition. The display control unit 205 controls the display performed by the display unit 104. Further, in the case where the display unit 104 functions as both the input unit 107 and the UI, the display control unit 205 may control the UI. The data transfer control unit 206 controls and manages data communication (data transfer) of captured image data stored in the storage unit 102. Note that in the following description, data may be treated as a data file.

The following describes an example of communication continuation determination processing performed by the determination unit 204. As one example, the determination unit 204 can confirm whether or not it has been determined that the digital camera 301 needs to perform cellular network communication. As a specific example, the determination unit 204 can confirm whether or not the control unit 101 is executing an application (service) that requires cellular network communication. One example of such an application is an application for remotely controlling the digital camera 301 via cellular network communication. In this case, the determination unit 204 can determine that it is necessary to continue communication with the LTE base station 302 while the control unit 101 is executing the application (service). In other words, the determination unit 204 can determine that it is not necessary to continue communication with the LTE base station 302 when the control unit 101 is not executing the application (service). As another example, when captured image data transfer is being performed under the control of the data transfer control unit 206, the determination unit 204 may confirm whether or not the remaining time required for captured image data transfer is less than or equal to a predetermined time (predetermined value). In this case, the determination unit 204 can determine that it is necessary to continue communication with the LTE base station 302 if the remaining time is less than or equal to the predetermined time, and, if otherwise, can determine that it is not necessary to continue communication with the LTE base station 302. The remaining time can be calculated by the data transfer control unit 206 based on the remaining amount of captured image data that needs to be transferred and the average throughput so far in communication with the LTE base station 302.

Processing Flow

Figure 4:
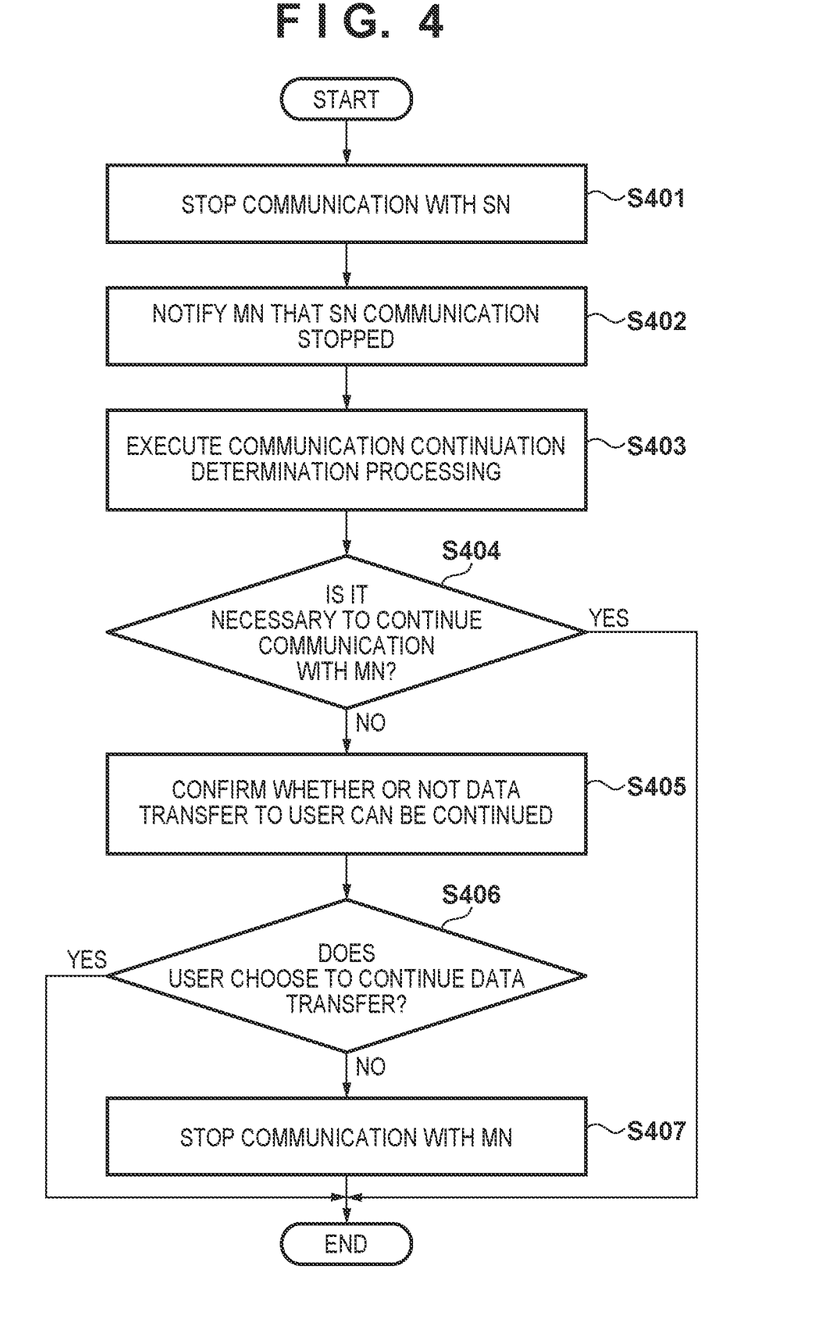
FIG. 4 is an operation flow diagram of processing when DC is stopped in a first embodiment.

The following describes the operation of the digital camera 301 of the present embodiment with reference to FIG. 4. FIG. 4 is a flowchart of processing when DC is stopped in the present embodiment. In the case where the digital camera 301 is executing DC communication and transferring captured image data, the processing shown in FIG. 4 may be started in response to the fact that the control unit 101 determined that DC communication is to be stopped. The determination to stop DC communication may be made in response to, for example, the fact that the control unit 101 detected that the remaining battery level of the digital camera 301 is less than a predetermined value during DC communication. Also, while the control unit 101 is executing an captured image data transfer application, it may be determined that DC communication is to be stopped at a suitable timing in the program of the application that is being executed. Further, the control unit 101 may determine that DC communication is to be stopped in accordance with a user instruction given via the input unit 107.

First, in step S401, the connection control unit 203 performs processing for stopping 5G communication with the 5G base station 303 (SN). At this time, the connection control unit 203 can control the state of the digital camera 301. For example, the connection control unit 203 may change the state of the digital camera 301 to the RRC Idle state, which means a standby state as a 5G UE state. Also, the connection control unit 203 may change the state of the digital camera 301 to the RRC Inactive state, which means an intermediate state between standby and connection as a 5G UE state. Further, the connection control unit 203 may change the state of the digital camera 301 to a state having no state as a 5G UE by completely stopping the 5G communication function of the digital camera 301.

After the connection control unit 203 stops 5G communication with the 5G base station 303, the transmission unit 201 notifies the LTE base station (MN) that 5G communication with the 5G base station 303 has been stopped (S402). Here, the transmission unit 201 may, for example, transmit a link failure information message to the LTE base station 302, or transmit another message indicating that communication with the LTE base station 302 has stopped.

Subsequently, in step S403, the determination unit 204 executes communication continuation determination processing to determine whether or not communication with the LTE base station 302 (communication with MN) needs to continue. The communication continuation determination processing is as described above. If it is determined that communication with the LTE base station 302 needs to continue (Yes in S404), the connection control unit 203 ends this processing while continuing communication with the LTE base station 302. On the other hand, if it is determined that communication with the LTE base station 302 does not need to continue (No in S404), processing moves to step S405. In step S405, the display control unit 205 displays a screen on the display unit 104 for confirming whether or not to continue the captured image data transfer, and confirms with the user whether or not to continue the captured image data transfer.

Figure 5:
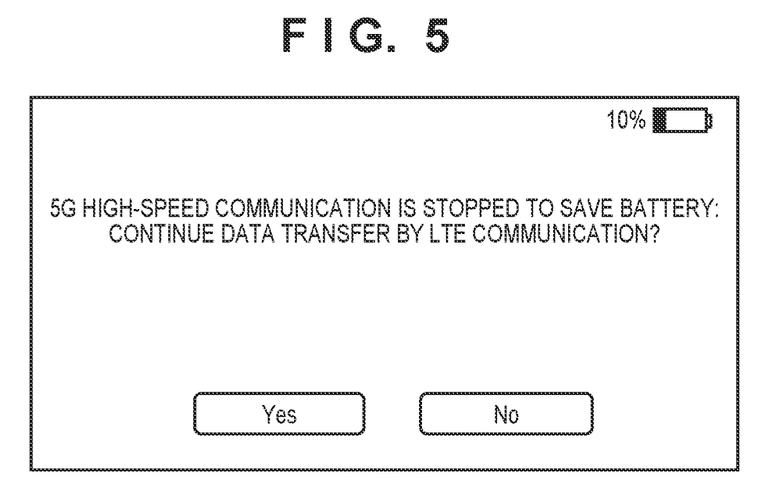
FIG. 5 is a diagram showing an example of a screen for confirming whether or not captured image data transfer is to continue in the first embodiment.
Figure 6:
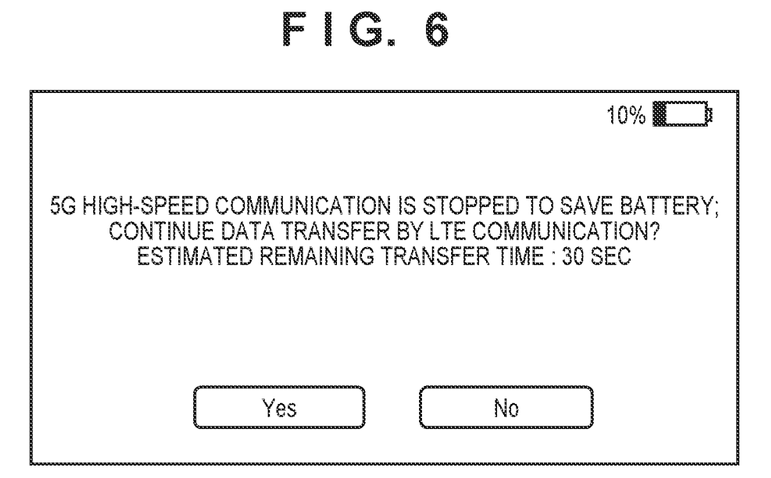
FIG. 6 is a diagram showing another example of a screen for confirming whether or not captured image data transfer is to continue in the first embodiment.

FIGS. 5 and 6 show an example of a screen for confirming whether or not to continue the captured image data transfer. In FIG. 5, a screen including the message "Continue data transfer by LTE communication?" is displayed in order to confirm with the user whether or not to continue the captured image data transfer. Also, in FIG. 6, a screen including the remaining time required for captured image data transfer, which was calculated by the data transfer control unit 206 through the above-mentioned method or the like, is displayed in order to confirm with the user whether or not to continue the captured image data transfer. In the screen examples of both of the figures, if "Yes" is selected by the user via the input unit 107, the connection control unit 203 ends this processing while continuing communication with the LTE base station 302. On the other hand, if "No" is selected, the data transfer control unit 206 ends the transfer of the captured image data, and the connection control unit 203 stops LTE communication with the LTE base station 302 (communication with the MN) (S407) and ends this processing.

After LTE communication is stopped in step S405, the connection control unit 203 can control the state of the digital camera 301. For example, the connection control unit 203 may change the state of the digital camera 301 to the RRC Idle state, which means a standby state as an LTE UE state. Also, the connection control unit 203 may change the state of the digital camera 301 to a state having no state as an LTE UE by completely stopping the LTE communication function.

Note that if the data transfer control unit 206 is performing multiple types of captured image data transfer processing, such as when the control unit 101 is executing multiple captured image data transfer applications, confirmation processing may be performed for all of the various types of captured image data transfer processing in step S405. In this case, in the subsequent step S406, if the continuation of communication with the LTE base station 302 is not selected for all of the types of captured image data transfer processing, the connection control unit 203 may stop communication with the LTE base station 302 and end this processing.

Figure 7:
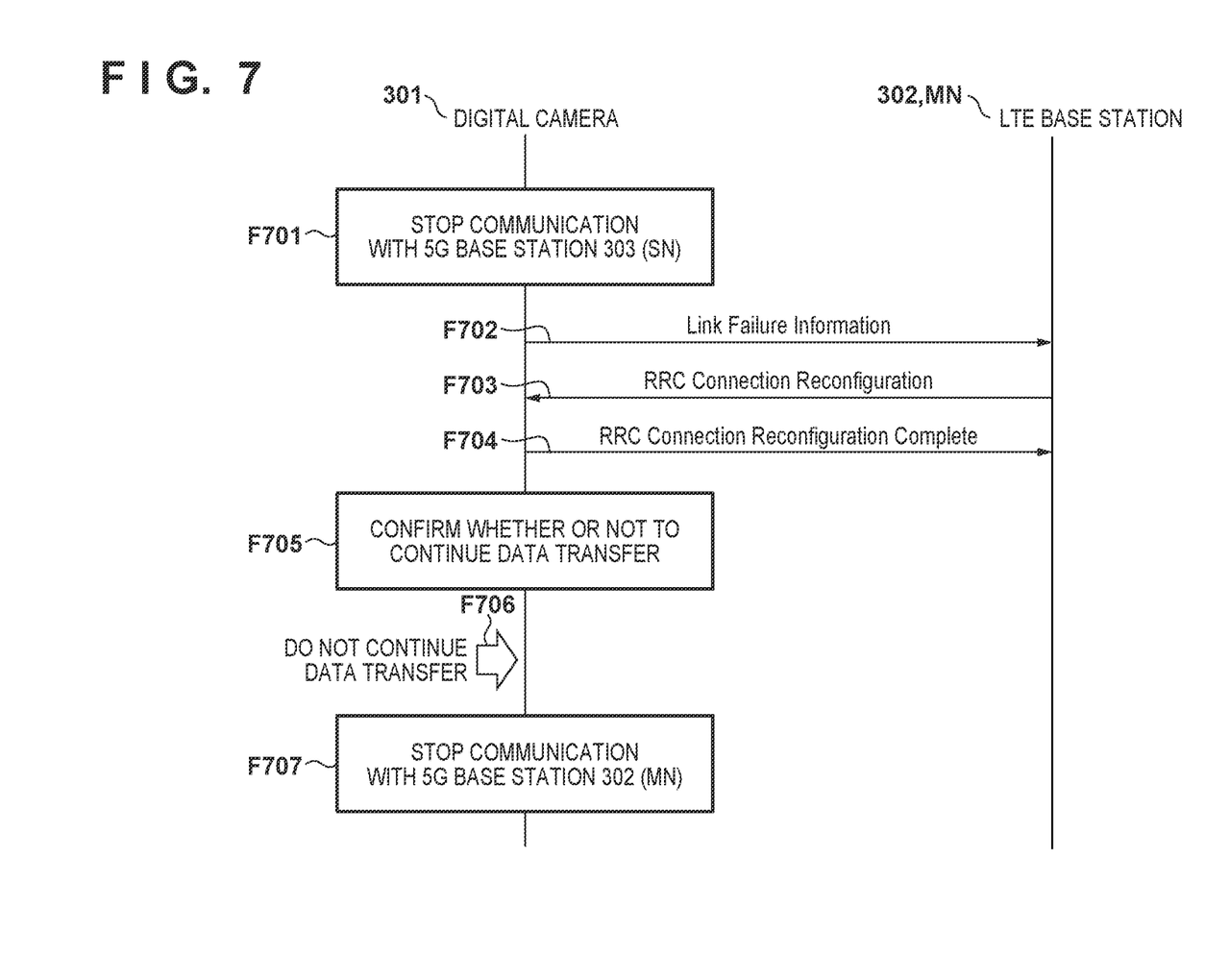
FIG. 7 is an operation sequence diagram for the digital camera and an LTE base station according to the first embodiment.

The following describes the flow of signals when DC is stopped in the present embodiment with reference to FIG. 7. FIG. 7 shows a sequence of processing operations performed between the digital camera 301 and the LTE base station 302 when DC is stopped. Note that FIG. 7 assumes that it has not been determined in advance that communication by the digital camera 301 requires cellular network communication.

When the remaining battery level of the digital camera 301 falls below the predetermined value during DC communication, the DC stop processing illustrated in FIG. 4 is started, and the digital camera 301 stops communication with the 5G base station 303 (F701, S401). After communication with the 5G base station 303 is stopped, the digital camera 301 transmits a link failure information message notifying the LTE base station 302 that communication with the 5G base station 303 has been stopped (F702, S402).

Upon receiving the link failure information message, the LTE base station 302 executes processing for stopping DC communication, and transmits an RRC connection reconfiguration message, which is a notification for updating settings for connection with the base station, to the digital camera 301 (F703). In response to the RRC connection reconfiguration message, the digital camera 301 transmits an RRC connection reconfiguration completion message to the LTE base station 302 (F704).

If it has been determined that communication with the LTE base station 302 does not need to continue (No in S404), the digital camera 301 confirms with the user whether or not captured image data transfer is to continue (F705, S405). If the user chooses to not continue the captured image data transfer (F706, No in S406), the digital camera 301 stops communication with the LTE base station 302 (F707, S407).

As described above, according to the present embodiment, if DC communication is stopped, whether or not the digital camera 301 is to continue communication the LTE base station 302 (MN) is determined by user selection. As a result, when low-throughput communication does not meet the user's wishes, it is possible to stop communication with the LTE base station 302 at the user's discretion, and as a result, user convenience is improved.

Second Embodiment

In the first embodiment, a method is described in which the user confirms whether or not to continue communication with the LTE base station 302 after the digital camera 301 has performed communication continuation determination processing regarding communication with the LTE base station 302. Hereinafter, as a second embodiment, a method is described in which the digital camera 301 determines whether or not to continue communication with the LTE base station 302 and the 5G base station 303 after the user has confirmed whether or not to continue communication with the LTE base station 302. In the following, differences from the first embodiment will be described.

Processing Flow

Figure 8:
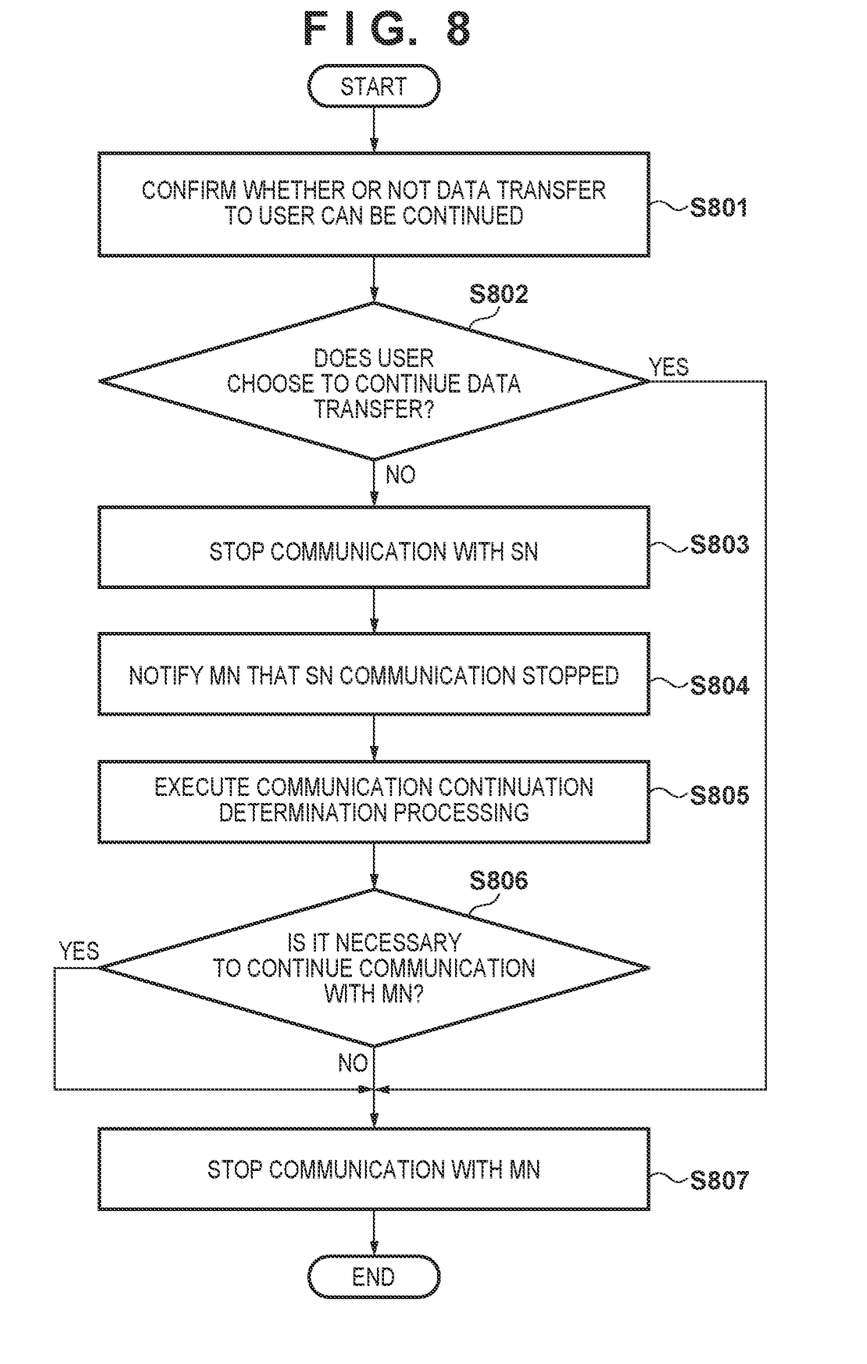
FIG. 8 is an operation flow diagram of processing when DC is stopped according to a second embodiment.

The following describes the operation of the digital camera 301 according to the present embodiment with reference to FIG. 8. FIG. 8 is a flowchart of processing when DC is stopped in the present embodiment. The processing shown in FIG. 8 may be started in response to the control unit 101 determining to stop DC communication while the digital camera 301 is executing DC communication and transferring captured image data. The determination to stop DC communication may be made in response to, for example, the fact that the control unit 101 detected that the remaining battery level of the digital camera 301 is less than a predetermined value during DC communication. Also, while the control unit 101 is executing an captured image data transfer application, it may be determined that DC communication is to be stopped at a suitable timing in the program of the application that is being executed. Further, the control unit 101 may determine that DC communication is to be stopped in accordance with a user instruction given via the input unit 107.

Figure 9:
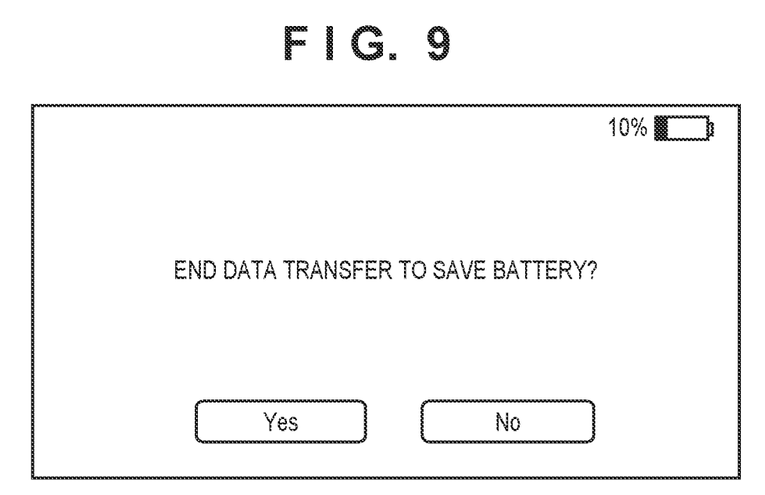
FIG. 9 is a diagram showing another example of a screen for confirming whether or not captured image data transfer is to continue in the second embodiment.

First, in step S801, the display control unit 205 displays a screen on the display unit 104 for confirming whether or not captured image data transfer is to continue, and confirms with the user whether or not captured image data transfer is to continue. FIG. 9 shows an example of a screen for confirming whether or not to continue the captured image data transfer. In FIG. 9, a screen including the message "End data transfer?" is displayed in order to confirm with the user whether or not to continue the captured image data transfer. If "Yes" is selected by the user via the input unit 107 in the screen shown in FIG. 9, the connection control unit 203 ends this processing while continuing communication with the LTE base station 302. On the other hand, if "No" is selected, the data transfer control unit 206 ends the transfer of the captured image data, and the connection control unit 203 stops 5G communication with the 5G base station 303 (SN) (S803).

After the connection control unit 203 stops 5G communication with the 5G base station 303, the transmission unit 201 notifies the LTE base station (MN) that 5G communication with the 5G base station 303 has been stopped (S804). Subsequently, in step S805, the determination unit 204 executes communication continuation determination processing to determine whether or not communication with the LTE base station 302 needs to continue. The communication continuation determination processing is as described above. Note that since the transfer of captured image data is ended in step S803, the determination unit 204 may determine whether or not it is necessary to continue communication with the LTE base station 302 based on, for example, whether or not the control unit 101 is executing an application (service) that requires cellular network communication. If it is determined that communication with the LTE base station 302 needs to continue (Yes in S806), the connection control unit 203 ends this processing while continuing communication with the LTE base station 302. On the other hand, if it is determined that communication with the LTE base station 302 does not need to continue (No in S806), the connection control unit 203 stops LTE communication with the LTE base station 302 (communication with MN) (S807) and ends this processing.

Figure 10:
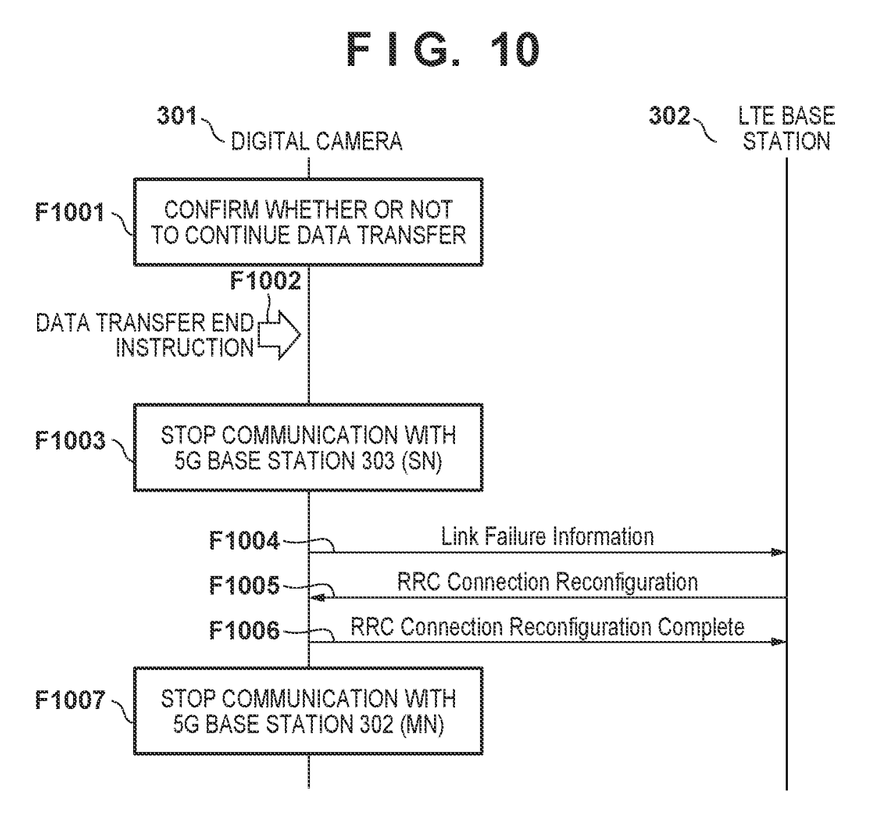
FIG. 10 is an operation sequence diagram for the digital camera and the LTE base station according to the second embodiment.

The following describes the flow of signals when DC is stopped in the present embodiment with reference to FIG. 10. FIG. 10 shows a sequence of processing operations performed between the digital camera 301 and the LTE base station 302 when DC is stopped. Note that FIG. 10 assumes that it has not been determined in advance that communication by the digital camera 301 requires cellular network communication.

If the remaining battery level of the digital camera 301 falls below the predetermined value during DC communication, the DC stop processing illustrated in FIG. 9 is started, and the digital camera 301 confirms with the user whether or not to continue captured image data transfer (F1001, S801). If the user chooses to not continue the captured image data transfer (F1002, No in S802), the digital camera 301 ends the captured image data transfer and stops communication with the 5G base station 303 (F1003, S803). After communication with the 5G base station 303 is stopped, the digital camera 301 transmits a link failure information message for notifying the LTE base station 302 that communication with the 5G base station 303 has been stopped (F1004). Upon receiving the link failure information message, the LTE base station 302 executes processing for stopping DC communication, and transmits an RRC connection reconfiguration message, which is a notification for updating settings for connection with the base station, to the digital camera 301 (F1005).

In response to the RRC connection reconfiguration message, the digital camera 301 transmits an RRC connection reconfiguration completion message to the LTE base station 302 (F1006). If the digital camera 301 determined that communication with the LTE base station 302 does not need to continue (No in S806), the digital camera 301 stops communication with the LTE base station 302 (F1007, S807).

As described above, according to the present embodiment, the digital camera 301 can determine whether or not communication with the LTE base station 302 (MN) and the 5G base station 303 (SN) can continue after confirming whether data transfer can continue. This makes it possible to continue data transfer without stopping communication with the 5G base station if the user prioritizes communication for data transfer over power consumption.

In the embodiments described above, cases where the MN is an LTE base station and the SN is a 5G base station have been described, but the present invention is not limited to this. The MN may be a 5G base station and the SN may be an LTE base station. In this case, the present invention can be applied by replacing the 5G base station and the LTE base station of the embodiments with each other.

Further, in the embodiments described above, the case where the digital camera 301 uploads captured image data has been described, but the above processing can also be applied to the case where the digital camera 301 downloads captured image data. The amount of data to be downloaded may be predetermined, such as being known to the digital camera 301 in advance. In this case, the transfer of captured image data in the above embodiments is replaced with the downloading of captured image data when processing is performed.

Further, in the embodiments described above, it is confirmed with the user whether or not to continue captured image data transfer at the timing when communication with the 5G base station 303 (SN) is stopped (DC communication is stopped), but the timing of the confirmation is not limited to this. For example, a setting indicating whether or not the user wishes to continue captured image data transfer may be set in advance in the digital camera 301. Further, in the embodiments described above, the confirmation is performed through a screen (as shown in FIG. 5, 6, or 9), but the confirmation may be performed by any method, and may be performed without using such a screen.

According to the present invention, the communication mode to be used after DC is stopped can be determined by user selection, and user convenience can be improved over conventional technology.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus comprising:
a communication unit configured to perform data communication using a master base station and a secondary base station;
a first stopping unit configured to stop communication with the secondary base station when the communication unit is performing the data communication using the master base station and the secondary base station;
a confirming unit configured to confirm with a user whether or not the data communication is to continue in a case where communication with the secondary base station is stopped by the first stopping unit; and
a second stopping unit configured to stop communication with the master base station in a case where the confirming unit confirmed that the data communication is not to continue.

2. The communication apparatus according to claim 1, further comprising:
a determining unit configured to determine whether or not communication with the master base station needs to continue,
wherein when communication with the secondary base station is stopped by the first stopping unit, in a case where the determining unit determined that communication with the master base station does not need to continue, the confirming unit confirms with the user whether or not to continue the data communication.

3. The communication apparatus according to claim 1, further comprising:
a determining unit configured to determine whether or not communication with the master base station needs to continue,
wherein in a case where the confirming unit confirmed that the data communication is not to continue, the first stopping unit stops communication with the secondary base station, and
after communication with the secondary base station is stopped by the first stopping unit, in a case where the determining unit determined that communication with the master base station does not need to continue, the second stopping unit stops communication with the master base station.

4. The communication apparatus according to claim 2, wherein
in a case where the communication apparatus is not executing a service that requires cellular network communication, the determining unit determines that communication with the master base station does not need to continue.

5. The communication apparatus according to claim 2, wherein in a case where a remaining time required for data communication is longer than a predetermined time, the determining unit determines that communication with the master base station does not need to continue.

6. The communication apparatus according to claim 2, further comprising:
a notifying unit configured to, in a case where communication with the secondary base station was stopped by the first stopping unit, notifying the master base station that communication with the secondary base station was stopped,
wherein the determining unit determines whether or not communication with the master base station needs to continue after the notifying unit gives the notification.

7. The communication apparatus according to claim 1, wherein
the confirming unit confirms whether or not the data communication is to continue by displaying a predetermined screen on a display unit and allowing a user to select whether or not to continue the data communication.

8. The communication apparatus according to claim 1, wherein
the master base station and the secondary base station are each a base station that performs communication compliant with 3GPP standards.

9. The communication apparatus according to claim 1, wherein
the communication apparatus is a digital camera that includes an image capturing function, and the communication unit transmits captured image data obtained by the image capturing function.

10. A method for controlling communication apparatus, the method comprising:
performing data communication using a master base station and a secondary base station;
stopping communication with the secondary base station when the data communication is being performed using the master base station and the secondary base station;
confirming with a user whether or not the data communication is to continue in a case where communication with the secondary base station is stopped; and
stopping communication with the master base station in a case where it was confirmed that the data communication is not to continue.

11. A non-transitory computer-readable storage medium storing a computer program for causing a computer to execute a method for controlling a communication apparatus, the method comprising:
performing data communication using a master base station and a secondary base station;
stopping communication with the secondary base station when the data communication is being performed using the master base station and the secondary base station;
confirming with a user whether or not the data communication is to continue in a case where communication with the secondary base station is stopped; and
stopping communication with the master base station in a case where it was confirmed that the data communication is not to continue.

* * * * *